(12) United States Patent
Hall et al.

(10) Patent No.: US 7,591,607 B2
(45) Date of Patent: Sep. 22, 2009

(54) ASPHALT RECYCLING VEHICLE

(76) Inventors: David R. Hall, 2185 S. Larsen Pkwy., Provo, UT (US) 84606; Timothy C. Duke, 2185 S. Larsen Pkwy., Provo, UT (US) 84606; David Walhquist, 2185 S. Larsen Pkwy., Provo, UT (US) 84606; Codrin Daranga, 2185 S. Larsen Pkwy., Provo, UT (US) 84606; Tyson J Wilde, 2185 S. Larsen Pkwy., Provo, UT (US) 84606

( * ) Notice: Subject to any disclaimer, the term of this patent is extended or adjusted under 35 U.S.C. 154(b) by 601 days.

(21) Appl. No.: 11/421,105

(22) Filed: May 31, 2006

(65) Prior Publication Data

US 2006/0204331 A1   Sep. 14, 2006

Related U.S. Application Data

(63) Continuation-in-part of application No. 11/379,643, filed on Apr. 21, 2006, which is a continuation-in-part of application No. 11/164,947, filed on Dec. 12, 2005, which is a continuation-in-part of application No. 11/163,615, filed on Oct. 25, 2005, now Pat. No. 7,473,052, which is a continuation-in-part of application No. 11/070,411, filed on Mar. 1, 2005, now Pat. No. 7,223,049.

(51) Int. Cl.
*E01C 7/00* (2006.01)

(52) U.S. Cl. .............................. 404/75; 404/93; 404/94; 404/111

(58) Field of Classification Search ........................ None
See application file for complete search history.

(56) References Cited

U.S. PATENT DOCUMENTS

| 1,887,341 | A | 11/1932 | Venable |
| 1,898,158 | A | 2/1933 | Winkle |
| 2,039,078 | A | 4/1936 | Hertwig |
| 2,098,895 | A | 11/1937 | Velten |
| 2,633,782 | A | 4/1953 | Clement |
| 2,893,299 | A | 7/1959 | Moir |
| 2,908,206 | A | 10/1959 | Melanson |
| 2,938,438 | A | 5/1960 | Hamilton |
| 3,075,436 | A | 1/1963 | McRae |
| 3,361,042 | A | 1/1968 | Cutler |
| 3,698,293 | A | * 10/1972 | Wagner ........................ 404/122 |
| 3,732,023 | A | 5/1973 | Rank |
| 3,817,644 | A | 6/1974 | Matson |
| 3,904,245 | A | * 9/1975 | Clarke ........................ 299/37.4 |

(Continued)

*Primary Examiner*—Raymond W Addie
(74) *Attorney, Agent, or Firm*—Tyson J. Wilde

(57) ABSTRACT

A method for recycling a paved surface includes the steps of providing a motorized vehicle adapted to traverse a paved surface; providing the motorized vehicle with a plurality of degradation elements, a plurality of foaming elements and a plurality of compacting elements; each plurality being attached to a carriage slidably supported by a bearing surface of an underside of the motorized vehicle; degrading the paved surface with the plurality of degradation elements as the vehicle traverses the paved surface; foaming rejuvenation material by the plurality of foaming elements into the degraded surface as the surface is being degraded; and compacting the degraded surface and the rejuvenation material into a new surface with the plurality of compaction elements as the foaming elements continue to foam rejuvenation material into the degraded surface.

20 Claims, 14 Drawing Sheets

U.S. PATENT DOCUMENTS

| | | |
|---|---|---|
| 3,970,404 A | 7/1976 | Benedetti |
| 3,989,401 A | 11/1976 | Moench |
| 4,018,540 A | 4/1977 | Jackson |
| 4,104,736 A | 8/1978 | Mendenhall |
| 4,124,325 A | 11/1978 | Cutler |
| 4,127,351 A | 11/1978 | Vural |
| 4,172,679 A | 10/1979 | Wirtgen |
| 4,195,946 A | 4/1980 | Swisher |
| 4,215,949 A | 8/1980 | Gabriel, Jr. |
| 4,261,669 A | 4/1981 | Edo |
| 4,313,690 A | 2/1982 | Hojbjerg |
| 4,335,975 A | 6/1982 | Schoelkopf |
| 4,347,016 A | 8/1982 | Sindelar |
| 4,407,605 A | 10/1983 | Wirtgen |
| 4,473,320 A | 9/1984 | Register |
| 4,534,674 A | 8/1985 | Cutler |
| 4,594,022 A | 6/1986 | Jeppson |
| 4,668,017 A | 5/1987 | Petersen |
| 4,676,689 A | 6/1987 | Yant |
| 4,692,350 A | 9/1987 | Clarke |
| 4,784,518 A | 11/1988 | Cutler |
| 4,793,730 A | 12/1988 | Butch |
| 4,968,101 A | 11/1990 | Bossow |
| 5,066,070 A * | 11/1991 | Clarke ............... 299/37.4 |
| 5,131,788 A | 7/1992 | Hulicsko |
| 5,366,320 A | 11/1994 | Hanlon |
| 5,556,225 A | 9/1996 | Marino |
| 5,765,926 A | 6/1998 | Knapp |
| 5,791,814 A | 8/1998 | Wiley |
| 5,947,636 A | 9/1999 | Mara |
| 5,947,638 A | 9/1999 | Heims |
| 6,113,309 A * | 9/2000 | Hollon et al. ............ 404/84.5 |
| 6,158,920 A | 12/2000 | Malot |
| 6,236,923 B1 * | 5/2001 | Corcoran et al. ............ 701/50 |
| 6,334,735 B1 * | 1/2002 | Williams et al. ............ 404/79 |
| 6,371,689 B1 | 4/2002 | Wiley |
| 6,460,006 B1 * | 10/2002 | Corcoran ............... 702/137 |
| 6,551,018 B2 | 4/2003 | Baker |
| 6,565,281 B2 * | 5/2003 | Bruns et al. ............ 404/90 |
| 6,623,207 B2 | 9/2003 | Grubba |
| 6,769,836 B2 | 8/2004 | Llyod |
| 6,799,922 B2 | 10/2004 | Smith |
| 6,846,354 B2 | 1/2005 | Larsen |
| 6,902,606 B1 * | 6/2005 | Davies ............... 106/2 |

* cited by examiner

400

```
┌─────────────────────────────────────────────────────────────┐
│   Providing a motorized vehicle adapted to traverse a paved surface │
│                                                         401 │
└─────────────────────────────────────────────────────────────┘
                              │
┌─────────────────────────────────────────────────────────────┐
│  Providing the motorized vehicle with a plurality of degradation elements, a │
│  plurality of foaming elements and a plurality of compacting elements; each │
│  plurality being attached to a carriage slidably supported by a bearing surface │
│           of an underside of the motorized vehicle          │
│                                                         402 │
└─────────────────────────────────────────────────────────────┘
                              │
┌─────────────────────────────────────────────────────────────┐
│  Degrading the paved surface with the plurality of degradation elements as the │
│              vehicle traverses the paved surface            │
│                                                         403 │
└─────────────────────────────────────────────────────────────┘
                              │
┌─────────────────────────────────────────────────────────────┐
│  Foaming rejuvenation material by the plurality of foaming elements into the │
│           degraded surface as the surface is being degraded │
│                                                         404 │
└─────────────────────────────────────────────────────────────┘
                              │
┌─────────────────────────────────────────────────────────────┐
│  Compacting the degraded surface and the rejuvenation material into a new │
│  surface with the plurality of compaction elements as the foaming elements │
│       continue to foam rejuvenation material into the degraded surface. │
│                                                         405 │
└─────────────────────────────────────────────────────────────┘
```

Fig. 4

ASPHALT RECYCLING VEHICLE

CROSS REFERENCE TO RELATED APPLICATIONS

This application is a continuation-in-part of U.S. patent application Ser. No. 11/379,643 which was filed on Apr. 21, 2006 and entitled Method for Depositing Pavement Rejuvenation Materials into a layer of Aggregate. Application Ser. No. 11/379,643 is a continuation-in-part of Ser. No. 11/164,947 which was filed on Dec. 12, 2005 and entitled Apparatus for Depositing Pavement Rejuvenation Materials on a Road Surface. U.S. patent application Ser. No. 11/164,947 is a continuation-in-part of U.S. patent application Ser. No. 11/163,615 filed on Oct. 25, 2005 now U.S. Pat. No. 7,473,052 and entitled Apparatus, System, and Method for In Situ Pavement Recycling. U.S. patent application Ser. No. 11/163,615 is a continuation-in-part of U.S. patent application Ser. No. 11/070,411 filed on Mar. 1, 2005 now U.S. Pat. No. 7,223,049 and entitled Apparatus, System, and Method for Directional Degradation of a Paved Surface All of the above mentioned U.S. Patent Applications are herein incorporated by reference for all that they contain.

BACKGROUND OF THE INVENTION

Modern road surfaces typically comprise a combination of aggregate materials and binding agents processed and applied to form a smooth paved surface. The type and quality of the pavement components used, and the manner in which the pavement components are implemented or combined, may affect the durability of the paved surface. Even where a paved surface is quite durable, however, temperature fluctuations, weather, and vehicular traffic over a paved surface may result in cracks and other surface or sub-surface irregularities over time. Road salts and other corrosive chemicals applied to the paved surface, as well as accumulation of water in surface cracks, may accelerate pavement deterioration.

Road resurfacing equipment may be used to mill, remove, and/or recondition deteriorated pavement. In come cases, heat generating equipment may be used to soften the pavement, followed by equipment to mill the surface, apply pavement materials, and plane the surface. Often, new pavement materials may be combined with materials milled from an existing surface in order to recondition or recycle existing pavement. Once the new materials are added, the materials may be compacted and planed to restore a smooth paved surface.

U.S. Pat. No. 4,692,350 which is herein incorporated by reference for all that it discloses, teaches that substrates such as aggregates, particularly for road building, are coated with asphalt by foaming the asphalt and mixing the hot asphalt foam with the aggregate. The asphalt is foamed by dispersing water in the hot asphalt as to maintain the water in the liquid phase and then vaporizing the water to form the foam structure.

U.S. Pat. No. 6,846,354 which is herein incorporated by reference for all that is discloses, describes a process for preparing a warm mix asphalt composition by mixing an aggregate grain material with a soft binder, and adding a hard binder to the mixed aggregate grain material. The hard binder is foamed in a foaming process before it is introduced to the mixed grained aggregate material. A system for preparing the warm mix asphalt composition comprising a drying drum for heating and drying the aggregate component, a mixing mill for mixing the asphalt components and a mix storage silo, where the system also includes foam production facilities for foaming the hard binder before introduction to the mixing mill, is also disclosed.

U.S. Pat. No. 4,793,730 which is herein incorporated by reference for all that it contains, discloses a method and apparatus for renewing the surface of asphaltic paving at low cost and for immediate reuse. The asphalt surface is heated to about 300.degree.-500.degree. F. The surface is broken to a depth of about two inches and the lower material thoroughly mixed in situ with the broken surface material. After mixing, the material is further heated to fuse the heated mixture into a homogeneous surface. The surface is screeded for leveling and compacted by a road roller. A road machine is disclosed having a steam manifold for heating the asphalt, transversely reciprocating breaker bars having teeth adjusted to the depth desired, toothed mixing cylinders for mixing the broken material, and a second steam manifold for reheating the mixed material. Reciprocating screed bars on the road machine level the mixed and heated material. Final compacting may be done with a conventional road roller.

U.S. Pat. No. 4,261,669 which is herein incorporated by reference for all that it discloses, teaches a method and apparatus for repairing asphalt concrete road surfaces wherein a tractor a steam box and a car mounted with a screw cutter are coupled in this order and a series of linearly operated equipment is used on the asphalt concrete paved road surface, including a heater car, an asphalt finisher and a road roller in this order after the car. Each of the equipment is made to advance at low speed and the asphalt concrete paved road surface is artificially heated by the steam box to impart fluidity to the road surface, after which it is cut with the screw cutter and the cut asphalt concrete is conveyed into a heating chamber of the heater car, and water content in the asphalt concrete is removed by heating and stirring. The resulting asphalt concrete is adjusted to an optimum temperature suitable for asphalt concrete paving, and then is discharged from the heating chamber, and charged onto the surface of the cut road directly and thereafter the asphalt concrete paved road surface is tested by using the asphalt finisher and the road roller.

BRIEF SUMMARY OF THE INVENTION

A method for recycling a paved surface, comprising the steps of providing a motorized vehicle adapted to traverse a paved surface; providing the motorized vehicle with a plurality of degradation elements, a plurality of foaming elements and a plurality of compacting elements; at least two of the degradation elements being adapted for independent movement relative to each other; each plurality being attached to a carriage slidably supported by a bearing surface of an underside of the motorized vehicle; degrading the paved surface with the plurality of degradation elements as the vehicle traverses the paved surface; foaming rejuvenation material by the plurality of foaming elements into the degraded surface as the surface is being degraded; and compacting the degraded surface and the rejuvenation material into a new surface with the plurality of compaction elements as the foaming elements continue to foam rejuvenation material into the degraded surface.

In one embodiment of the present invention the compacting elements may be tampers, rollers, and/or vibrators. The compacting elements may also have a non stick and/or scratch resistant coating selected from the group consisting of Fluoropolymers, Teflon®, diamond, carbon coatings and combinations thereof. The compacting elements may further comprise a heated compacting surface. At least one compacting element may oscillate at a controlled frequency to assist in the compacting of the mix. The compacting elements may be movable with respect to the rest of the vehicle both longitudinally along the axis of the vehicle and transversely. The slidable carriage may have a hydraulic actuator, a pinion gear, a smart material actuator or an electric actuator to invoke its movement. In other embodiments the carriage may be pivotable. In one embodiment the compacting elements may have a density sensor for measuring the density of the paved road. The pressure applied by the compacting elements may also be measured and controlled.

In an embodiment of the present invention the compacting elements may operate independently of each other and be independently controllable. The compacting elements may function as part of a closed loop system. Other component in the closed loop system may include a density sensor, a position sensor, an actuator and a controller. The motorized vehicle may have multiple rows of compactors as well as a trimming compactor.

The foaming rejuvenation material may comprise bitumen, and water. The bitumen may be heated to a temperature of at least 100° F. The front translational elements of the motorized vehicle may be on old pavement and the back translational elements may be on resurfaced pavement. The degrading, foaming and compacting may take place between the front translational elements and the back translational elements.

BRIEF DESCRIPTION OF THE DRAWINGS

FIG. 4 is a block diagram of an embodiment of a method for recycling a paved surface.

DETAILED DESCRIPTION OF THE INVENTION AND THE PREFERRED EMBODIMENT

In this application, "pavement" or "paved surface" refers to any artificial, wear-resistant surface that facilitates vehicular, pedestrian, or other form of traffic. Pavement may include composites containing oil, tar, tarmac, macadam, tarmacadam, asphalt, asphaltum, pitch, bitumen, minerals, rocks, pebbles, gravel, polymeric materials, sand, polyester fibers, Portland cement, petrochemical binders, or combinations thereof. Likewise, rejuvenation materials refer to any of various binders, oils, and resins, including bitumen, surfactant, polymeric materials, emulsions, asphalt, tar, cement, oil, pitch, or combinations thereof. Reference to aggregates refers to rock, crushed rock, gravel, sand, slag, soil, cinders, minerals, or other course materials, and may include both new aggregates and aggregates reclaimed from an existing roadway. Likewise, the term "degrade" or "degradation" is used in this application to mean milling, grinding, cutting, ripping apart, tearing apart, or otherwise taking or pulling apart a pavement material into smaller constituent pieces.

Figure 1:
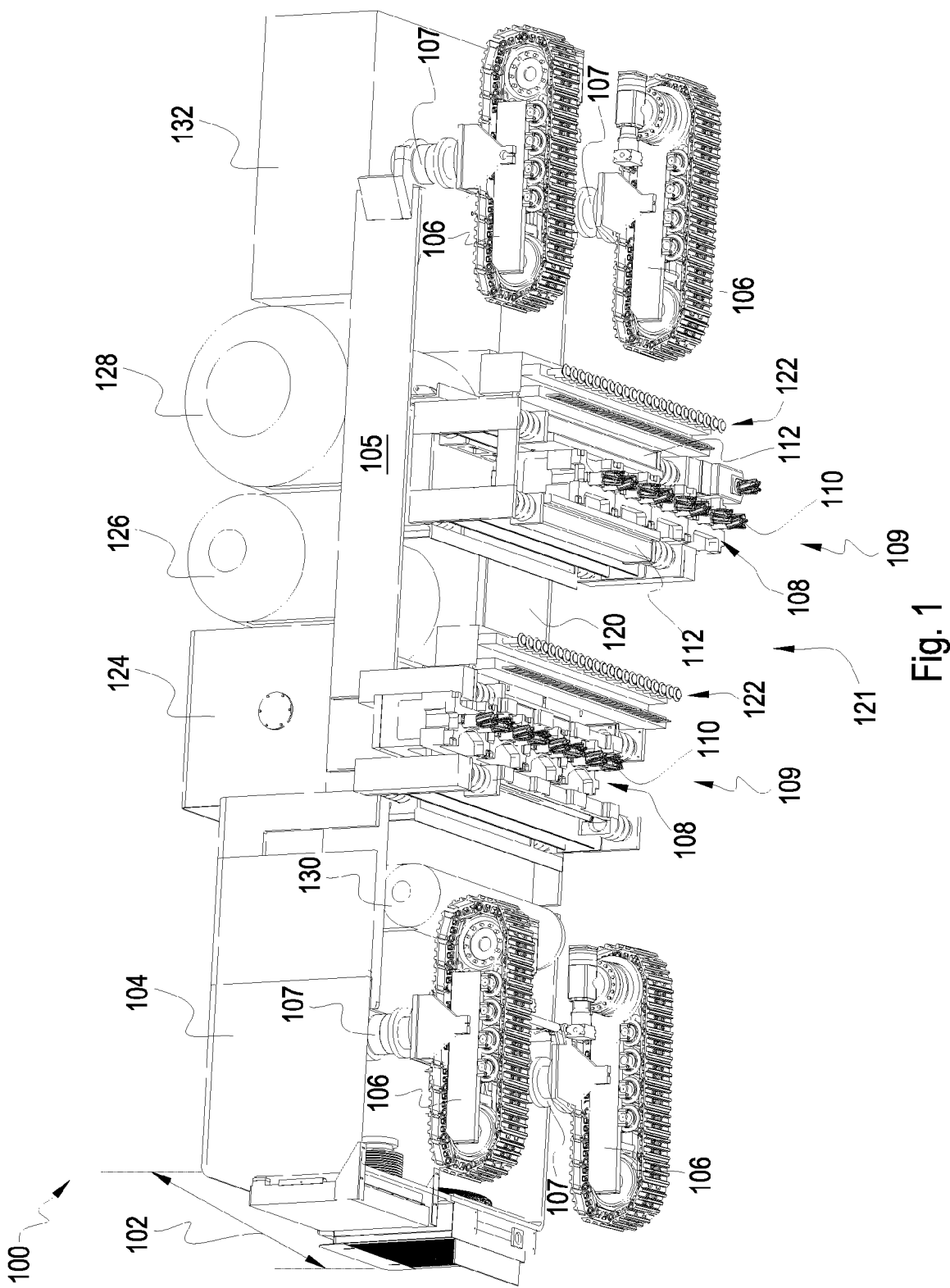
FIG. 1 is a perspective diagram of an embodiment of a motorized vehicle for on site recycling of asphalt.

Referring to FIG. 1, in selected embodiments, a motorized vehicle 100 may be adapted to degrade and recycle a section of pavement substantially wider than the vehicles width 102. The motorized vehicle 100 may include a shroud 104, covering various internal components of the motorized vehicle 100, a frame 105, and a translational element 106 such as tracks, wheels, or the like, to translate or move the vehicle 100, such translational element being well known to those skilled in the art. The motorized vehicle 100 may also include means 107 for adjusting the elevation and slope of the frame 105 relative to the translational element 106 to adjust for varying elevations, slopes, and contours of the underlying road surface.

In selected embodiments, to facilitate degradation of a swath of pavement wider than the motorized vehicle 100, the vehicle 100 may include one or more slidable carriages 108 supported by a bearing surface 120 of an underside 121 of the motorized vehicle 100 capable of extending beyond the outer edge of the vehicle 100. In some embodiments, the carriages 108 may be as wide as the vehicle 100 itself, the carriages 108 may sweep over a width approximately twice the vehicle width 102. These carriages 108 may include banks 109 of pavement degradation elements 110 that rotate about an axis substantially normal to a plane defined by a paved surface. Each of these pavement degradation elements 110 may be used to degrade a paved surface in a direction substantially normal to their axes of rotation. The slidable carriages may further comprise a row of compacting elements 122.

Under the shroud 104, the motorized vehicle 100 may include an engine and hydraulic pumps for powering the translational elements 106, the carriages 108, the pavement degradation elements 110, or other components. Likewise, the vehicle 100 may include a tank 124 for storing hydraulic fluid, a fuel tank 126, a tank 128 for storing rejuvenation materials such as asphalt, bitumen, oil, tar, or the like, a water tank 130, and a hopper 132 for storing aggregate such as gravel, rock, sand, pebbles, macadam, concrete, or the like.

Figure 2:
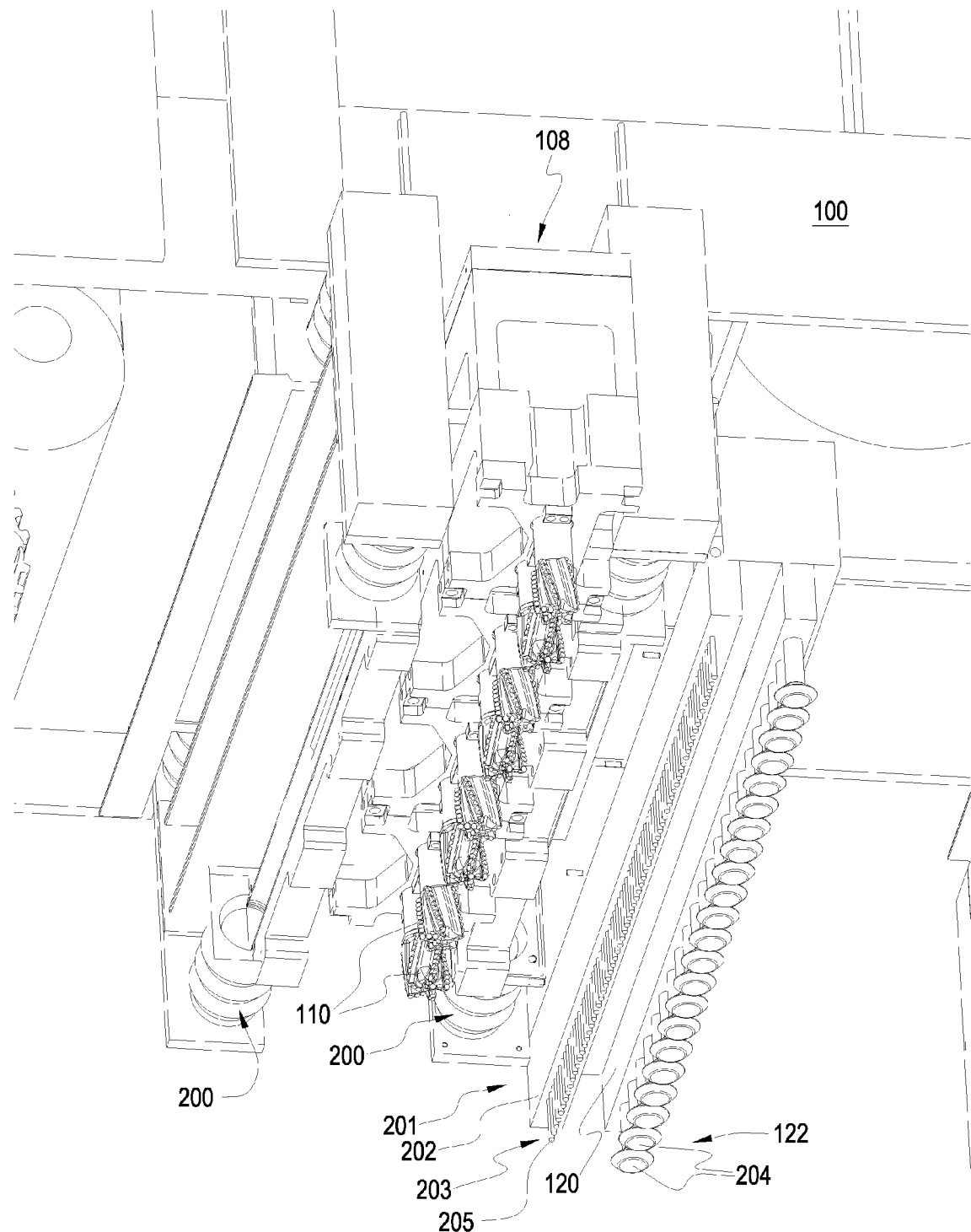
FIG. 2 is a perspective diagram of an embodiment of the slidable carriage.

FIG. 2 is a diagram of an embodiment of the slidable carriage 108. To extend the carriages 108 beyond the outer edge of the motorized vehicle 100, each of the carriages 108 may include actuators 200, such as hydraulic cylinders, pneumatic cylinders, or other mechanical devices known to those of skill in the art, to move the carriages 108 to each side of the vehicle 100. Each carriage 108 may also include a rake 201 to level, smooth, and mix pavement aggregates, including new aggregates and reclaimed aggregates generated by the pavement degradation tools 110. As illustrated, a rake 201 may include a housing 202 comprising multiple teeth 203 extending therefrom. In selected embodiments, each of the teeth 203 may be independently extended and retracted relative to the housing 202. This feature may allow selected teeth to be retracted to avoid obstacles such as manholes, grates, railroad tracks, or other obstacles in the roadway. In certain embodiments, each of the teeth 203 may comprise foaming elements 205 that may be hollow to accommodate a flow of pavement rejuvenation materials for deposit on a road surface. Pavement rejuvenation materials may include, for example, asphalt, bitumen, tar, oil, water, combinations thereof, or other suitable materials, resins, and binding agents. These rejuvenation materials may be mixed with various aggregates, including new aggregates and reclaimed aggregates generated by the pavement degradation tools 110. The resulting mixture may then be smoothed and compacted to form a recycled road surface. In selected embodiments, the rake 201 may move side-to-side, front-to-back, in a circular pattern, vibrate, or the like to aid in mixing the resulting mixture of aggregates and rejuvenation materials. In certain embodiments, each carriage 108 may include a bank 120 of one or more compacting elements 122 to compact the recycled road surface. In the current embodiment the compacting elements 122 are tampers 204. Like the teeth 203, the tampers 204 may, in certain embodiments, be independently extendable and retractable relative to the bank 120.

Figure 3:
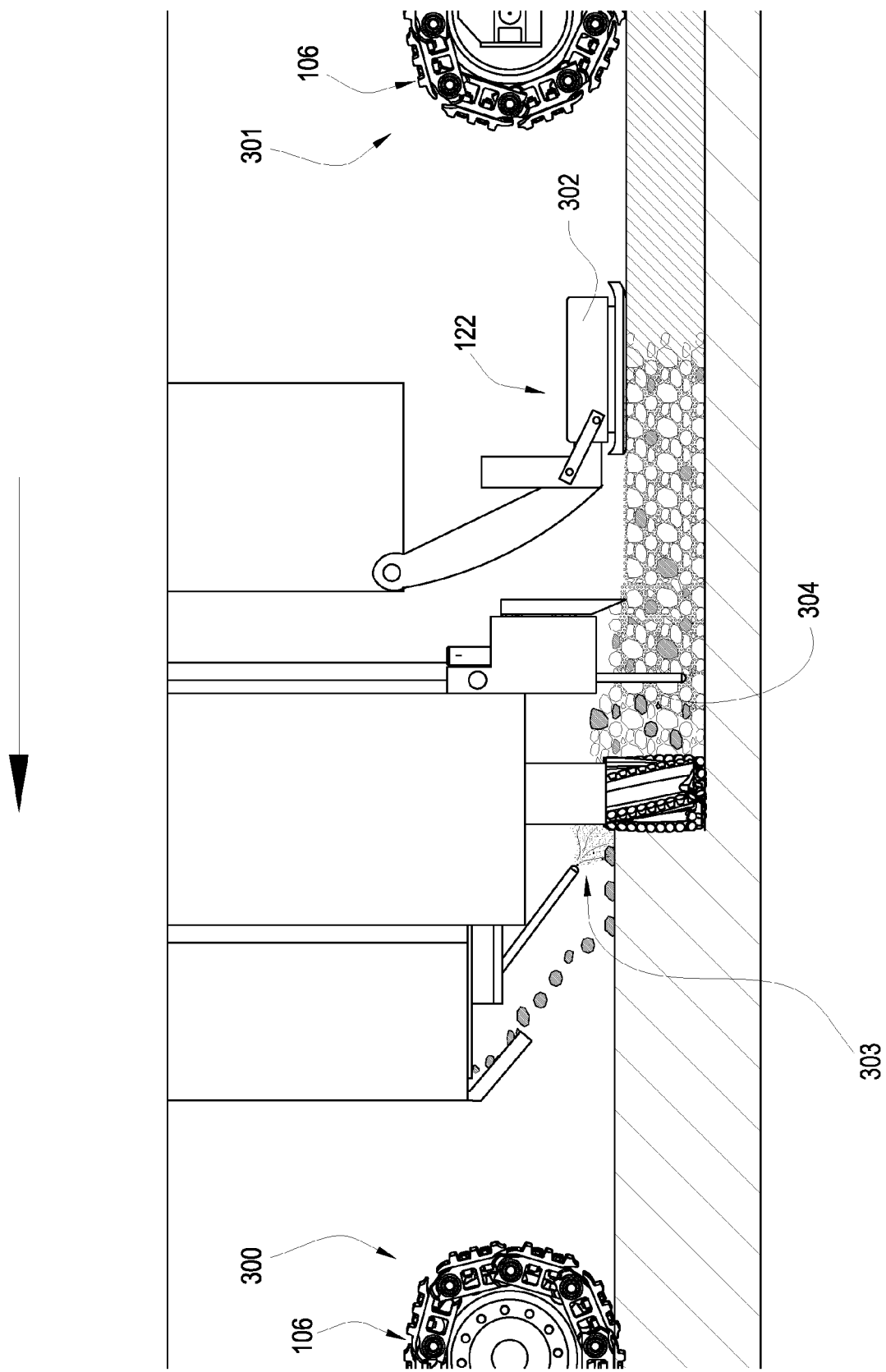
FIG. 3 is a perspective diagram of a section of an embodiment of a motorized pavement resurfacing vehicle.

Now referring to FIG. 3, the complete recycling process of degrading the old surface, mixing in rejuvenation material, and compacting to form new paved surface, may all take place between the front 300 translational elements 106 and the back 301 translational elements 106. This may cut down on the amount of equipment and time required to resurface a road. Since the front and back translational elements 106 are always on a paved surface, the need to drive a steam roller or other compaction machine over an edge of the mix may be eliminated. This may be beneficial since the steam roller may displace the mix. After the road has been degraded into its constituents, rejuvenation material 303 may be foamed into the aggregate 304. The foaming rejuvenation material 303 may comprise bitumen, tar, oil, water, resins, binding agents, and combinations thereof. The foamed rejuvenation material 303 may further be heated to a temperature of at least 100° F. The foam may be produced by mixing an oil-based rejuvenation material with water, preferably under high temperature and high pressure. The foam may be applied to the surface of the mix, or it may be added within the mix. One benefit the foam may provide is enhancing the rate at which the surface area of all of the aggregate gets coated. It is believed that foam comprising bitumen, some wax, polymers, and synthetic clay, and about 1-10 percent water injected into a mix heated to 100 to 275 degrees F. with a half-life of 5 to 60 seconds has the best results if compacted immediately after injection into the mix. In the present embodiment the compacting elements 122 are vibrating plates 302. The plates 302 may be weighted or have applied pressure to aid in compacting. The translational elements 300, 301 may be tracks, wheels and/or compacting rollers.

FIG. 4 is a block diagram of a method 400 for recycling a paved surface including the steps of providing 401 a motorized vehicle adapted to traverse a paved surface; providing 402 the motorized vehicle with a plurality of degradation elements, a plurality of foaming elements and a plurality of compacting elements; each plurality being attached to a carriage slidably supported by a bearing surface of an underside of the motorized vehicle; degrading 403 the paved surface with the plurality of degradation elements as the vehicle traverses the paved surface; foaming 404 rejuvenation material by the plurality of foaming elements into the degraded surface as the surface is being degraded; and compacting 405 the degraded surface and the rejuvenation material into a new surface with the plurality of compaction elements as the foaming elements continue to foam rejuvenation material into the degraded surface.

Figure 5:
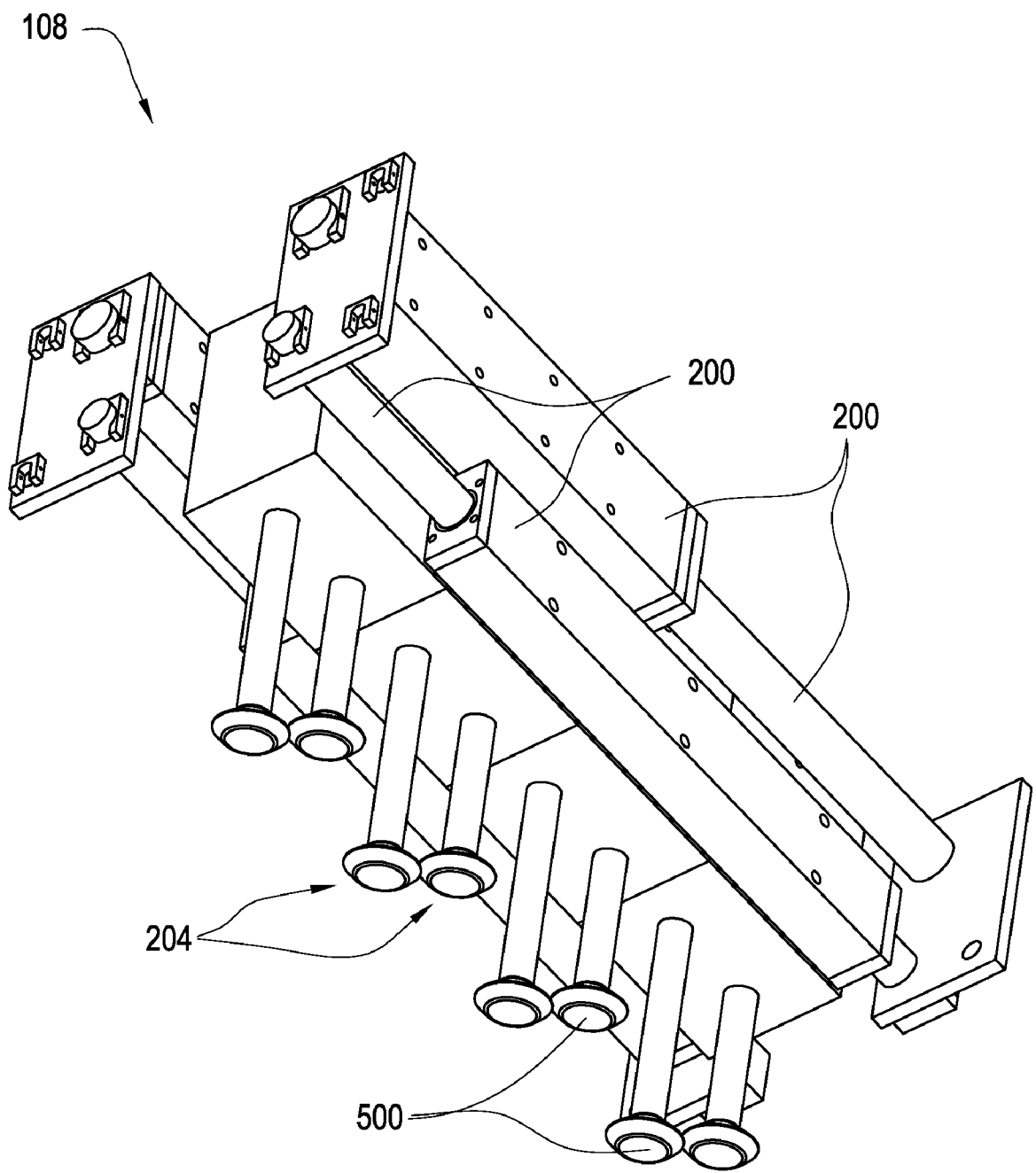
FIG. 5 is a perspective diagram of an embodiment of a slidable carriage.

FIG. 5 is a perspective diagram of an embodiment of a slidable carriage 108 with hydraulic cylinders 200 to control the position of the attached tampers 204. Other options for the positioning actuator may include but are not limited to, a pneumatic cylinder, a rack and pinion gear, an electric actuator, a smart material actuator such as a piezo actuator and combinations thereof. In one embodiment independent control may be available to each of the tampers 204 allowing the pressure applied by each tamper 204 to be unique. This may allow the pavement to be more uniformly packed by applying more pressure to regions of mix where it is loosely packed or less dense and applying less pressure to regions of pavement where the mix is already densely packed and close to a desired density. In the present embodiment every other tamper 204 is set to strike the mix in unison. Variations from this may include all of the tampers 204 striking in unison, or every tamper 204 at some designated number, such as every third tamper 204, striking in unison.

Figure 6:
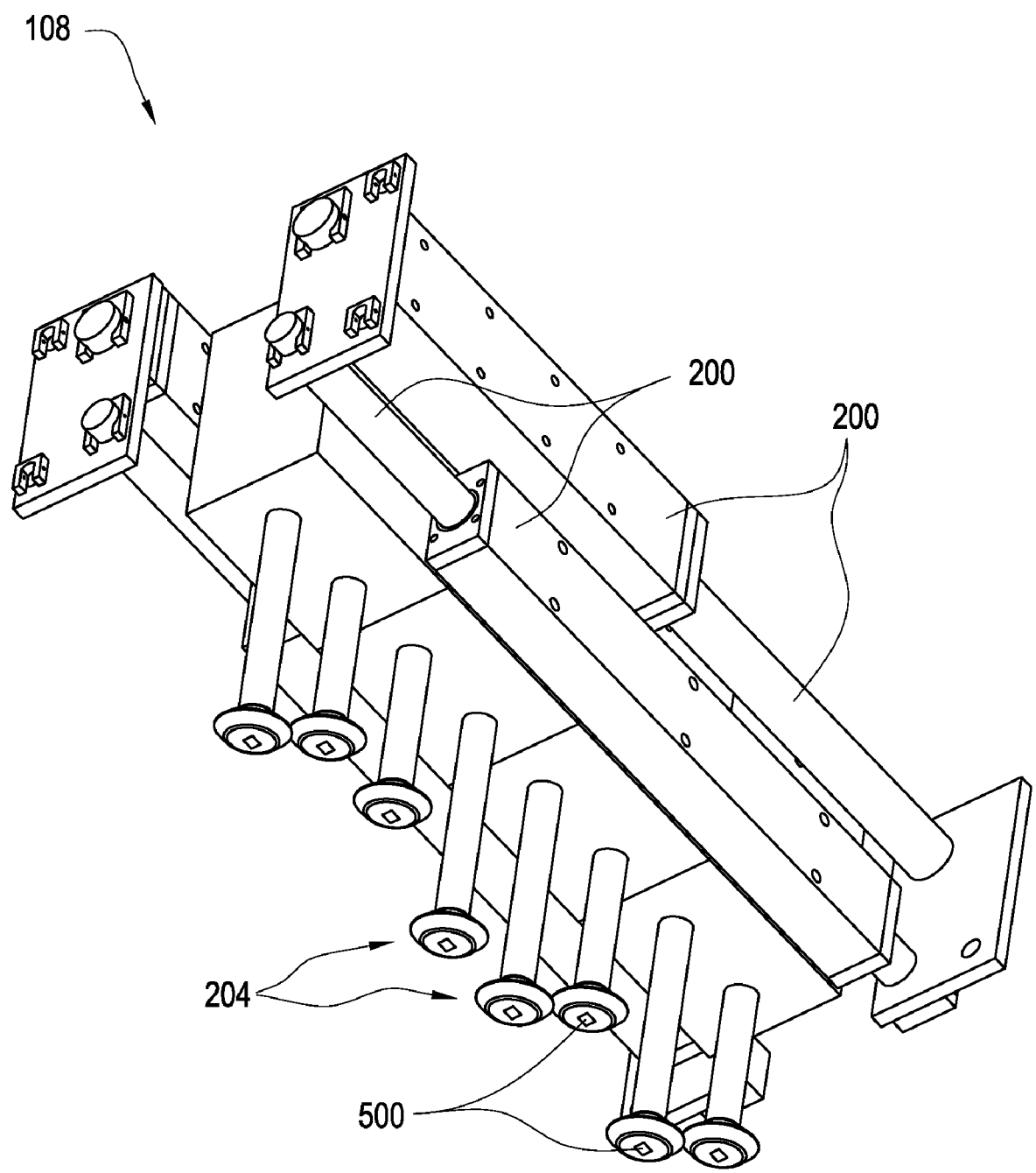
FIG. 6 is a perspective diagram of an embodiment of a slidable carriage.

FIG. 6 is a perspective diagram of an alternate embodiment of a slidable carriage 108 with hydraulic cylinders 200 to control the position of the attached tampers 204. In the present embodiment the tampers 204 may oscillate at varying frequencies and varying tamping patterns. The current embodiment may provide that each tamper 204 is independently controlled and each tamper 204 may strike at a unique time based on feedback from a sensor or based on a designated tamping sequence. This may allow the resurfacing machine better control over the compacting of the mix which may result in a paved surface with a more uniform density.

Figure 7:
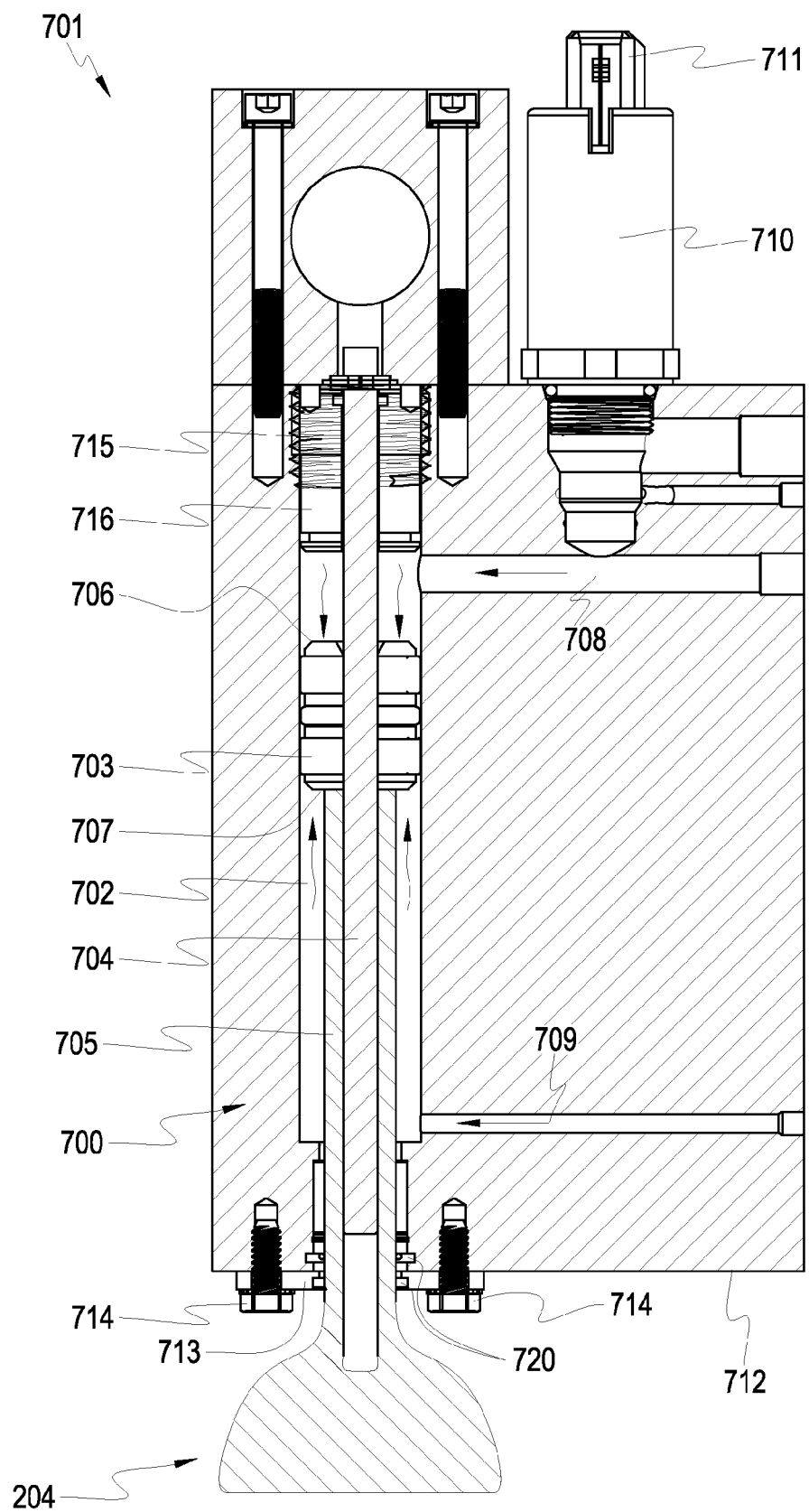
FIG. 7 is a cross sectional diagram of an embodiment of a tamper actuated with a hydraulic assembly.

FIG. 7 is a cross sectional diagram of a tamper 204 actuated with a hydraulic assembly 700. To extend and retract the tamper 204, a housing 701 may comprise a chamber 702 to accommodate the travel of a piston 703. A first shaft 704 may extend through the piston 703 down into a second shaft 705 connecting to the tamper 204. The diameter of the first shaft 704 may be less than the diameter of the second shaft 705 so that there is more surface area on the top 706 of the piston 703 then there is on the bottom 707 of the piston 703. In certain embodiments, the piston 703 may be driven by hydraulic fluid supplied under pressure to the chamber 702, although pressurized air or other fluids may also be used. In one embodiment, hydraulic fluid may be supplied to the chamber 702 through a pair of passageways 708, 709 in the housing 701. Hydraulic fluid supplied under pressure through a first passageway 708 may exert force on a top surface 706 of the piston 703, while hydraulic fluid supplied under pressure through a second passageway 709 may exert force on a bottom surface 707 of the piston 703.

In order to extend and retract the tamper 204, in selected embodiments, hydraulic pressure may be supplied continuously over time through the passageway 709. Conversely, a roughly equal hydraulic pressure may be selectively turned on or off through the passageway 708 by way of a valve 710. Thus, when hydraulic pressure through the passageway 708 is turned off, continuous pressure supplied through the passageway 709 urges the piston 703 upward. As the piston 703 travels upward, hydraulic fluid above the piston 703 and inside the passageway 708 may flow into a hydraulic fluid reservoir or tank (not shown). On the other hand, when hydraulic pressure through the passageway 708 is turned on, this hydraulic pressure overcomes the hydraulic pressure supplied through the passageway 709 (due to the difference in the piston surface areas 706, 707), thereby urging the piston 703 downward and extending the tamper 204 relative to the housing 701. In selected embodiments, the valve 710 may be solenoid driven, be screwed into the housing 701, and be actuated by way of an electrical connection 711.

At or near the bottom surface 712 of the housing 701, one or more bushings 720 may be used to act as a bearing between the chamber 702 and the housing 701, and one or more seals may be used to contain the hydraulic pressure within the chamber 702 and to prevent contamination from entering the chamber 702. The bushings 720 and/or seals may be retained and accessed by way of a plate 713 coupled to the housing 701 by way of one or more connectors 714, such as bolts 714. Similarly, a retainer 715 may be positioned at or near the top of the chamber 702 and may be used to retain the first shaft 704 in a substantially fixed position with respect to the housing 701. In selected embodiments, the retainer 715 may be screwed into the housing 701 and may include a clip to engage a slot milled in the first shaft 704. The retainer 715 may also include a stopper 716 to stop the upward travel of the piston 701.

Figure 8:
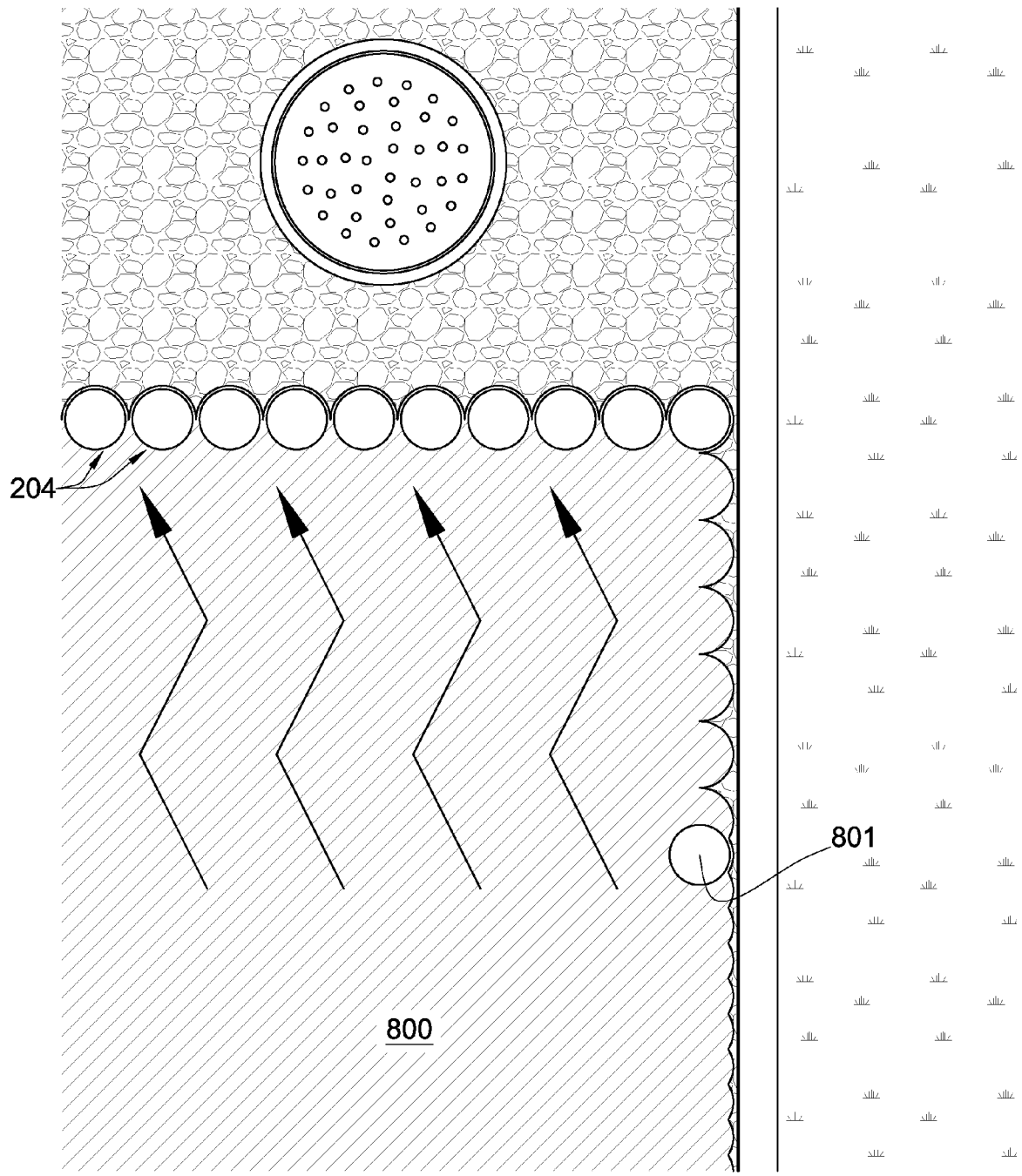
FIG. 8 is a diagram of an embodiment of a roadway being compacted with tampers.

FIG. 8 is a diagram of a roadway 800 being compacted with tampers 204. In the present embodiment a row of tampers 204 may compact rejuvenated mix using a zigzag tamping pattern. The row of tampers 204 may shift from right to left or left to right as the asphalt recycling vehicle is moved forward. An operator or a feedback network may control the rate at which the row of tampers 204 moves from side to side. The pressure applied by each tamper 204 may also be independently controlled. A trimming tamper 801 may be positioned on a side of the motorized vehicle to clean up the edges of the roadway 800 being repaved. The complete roadway 800 may be resurfaced all the way up to the sidewalk and a nice transition may be created between the resurfaced roadway 800 and the sidewalk. In one embodiment a tamper 204 may produce rumble strips on the side of the roadway 800 by varying the tamping pressure as the vehicle moves forward.

Figure 9:
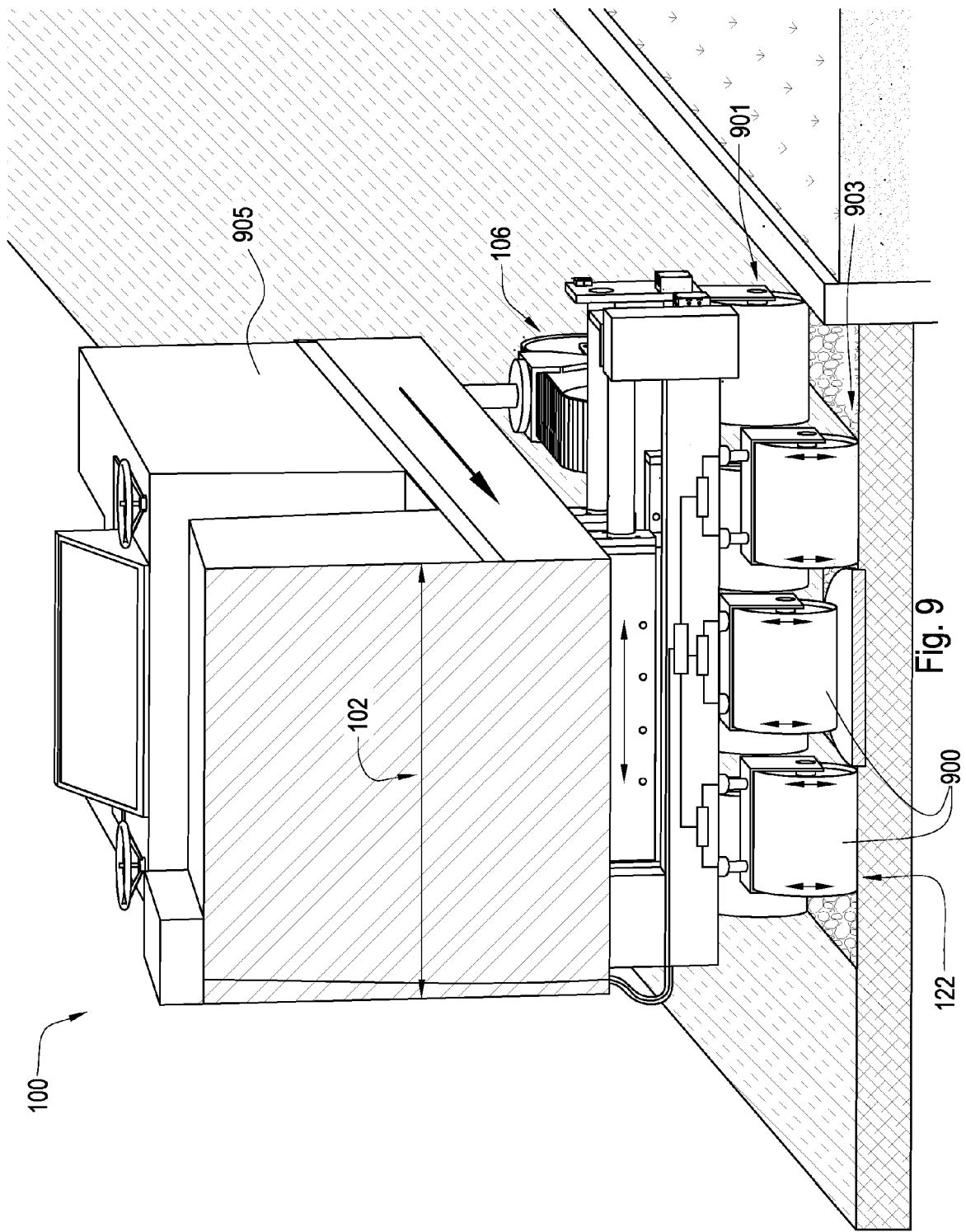
FIG. 9 is a diagram of the back end of an embodiment of a pavement recycling machine.

FIG. 9 is a diagram of the back end 905 of an embodiment of a pavement recycling machine 100. In the current embodiment the compacting elements 122 are rollers 900. The size and number of rollers 900 may vary from machine to machine. There may also be more than one row of rollers 900. In the present embodiment there are two rows of rollers 900. The second row 902 of rollers 900 may be used to further compact any areas of pavement as well as compact areas of pavement missed by the first row 903 of rollers 900. In one embodiment (not shown) the translational element 106 may be a roller 900. The length of the roller 900 may be equal to the width 102 of the motorized vehicle 100. In other embodiments, length of the roller may be shorter or longer than the width of the vehicle. If the translational element 106 is a roller 900 the weight of the vehicle may be sufficient to compact the mix to the desired density. As in other embodiments the compacting elements 122 may be independently positioned and there height may be adjusted to avoid obstacles.

Figure 10:
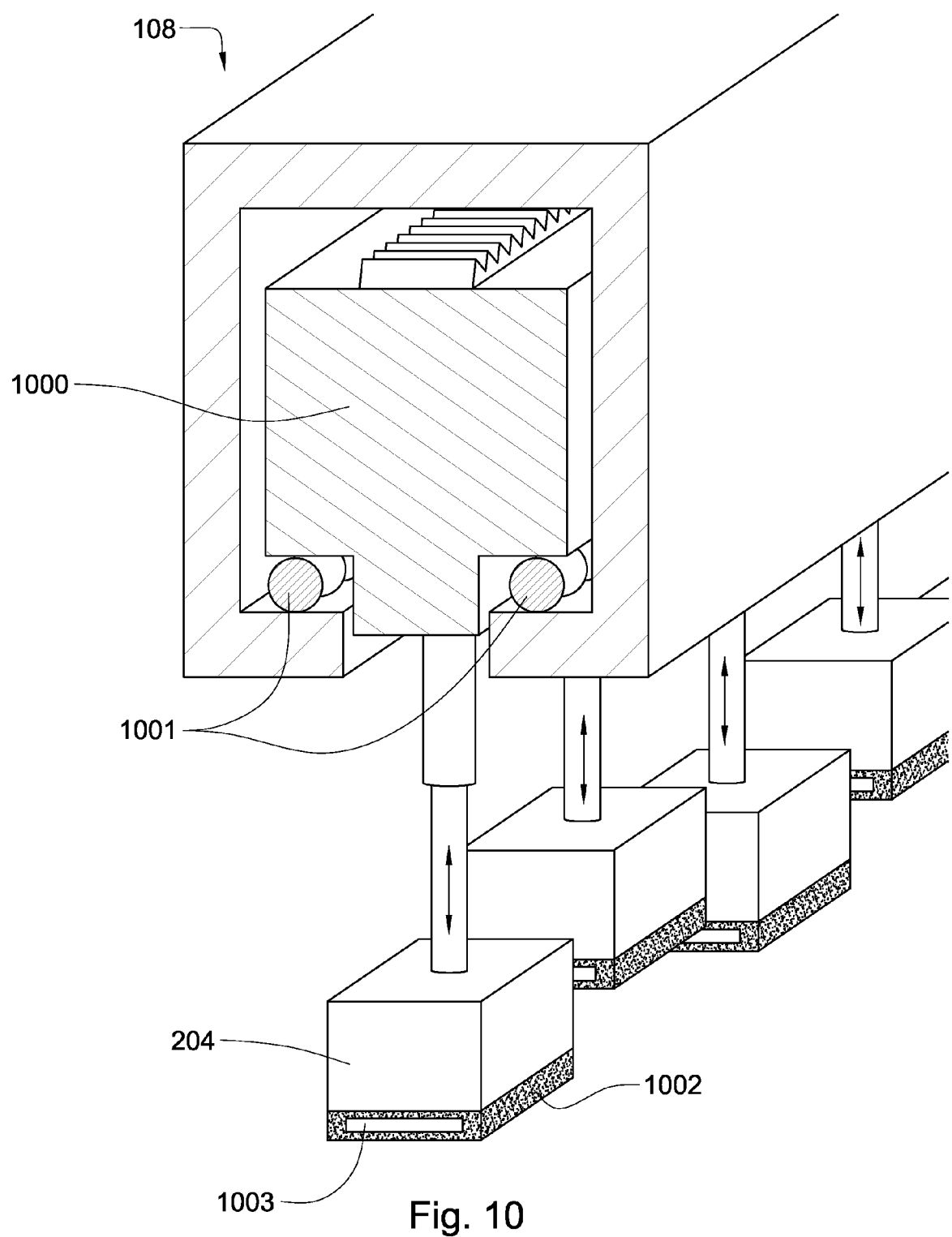
FIG. 10 is a diagram of an embodiment of a slidable carriage.

FIG. 10 diagrams an alternate embodiment of the slidable carriage 108 with tampers 204 connected to a rack gear 1000. In order to move the tampers 204 to the left or to the right, a pinion gear (not shown) is turned causing the rack gear 1000 to slide a long a set of bearings 1001. Plain or roller bearings may also be used. The tampers 204 may comprise a compacting surface 1002 comprising a non-stick and/or scratch resistant coating selected from the group consisting but not limited to Fluoropolymers, Teflon®, diamond, carbon coatings and combinations thereof. The non-stick surface 1002 may help prevent pieces of mix or other rejuvenation material from sticking to the compacting surface 1002 which in turn may lead to a smoother compaction of the mix. The tampers 204 may further comprise a heating element 1003 on the compacting surface 1002. This may help keep the mix at an appropriate temperature for compacting.

Figure 11:
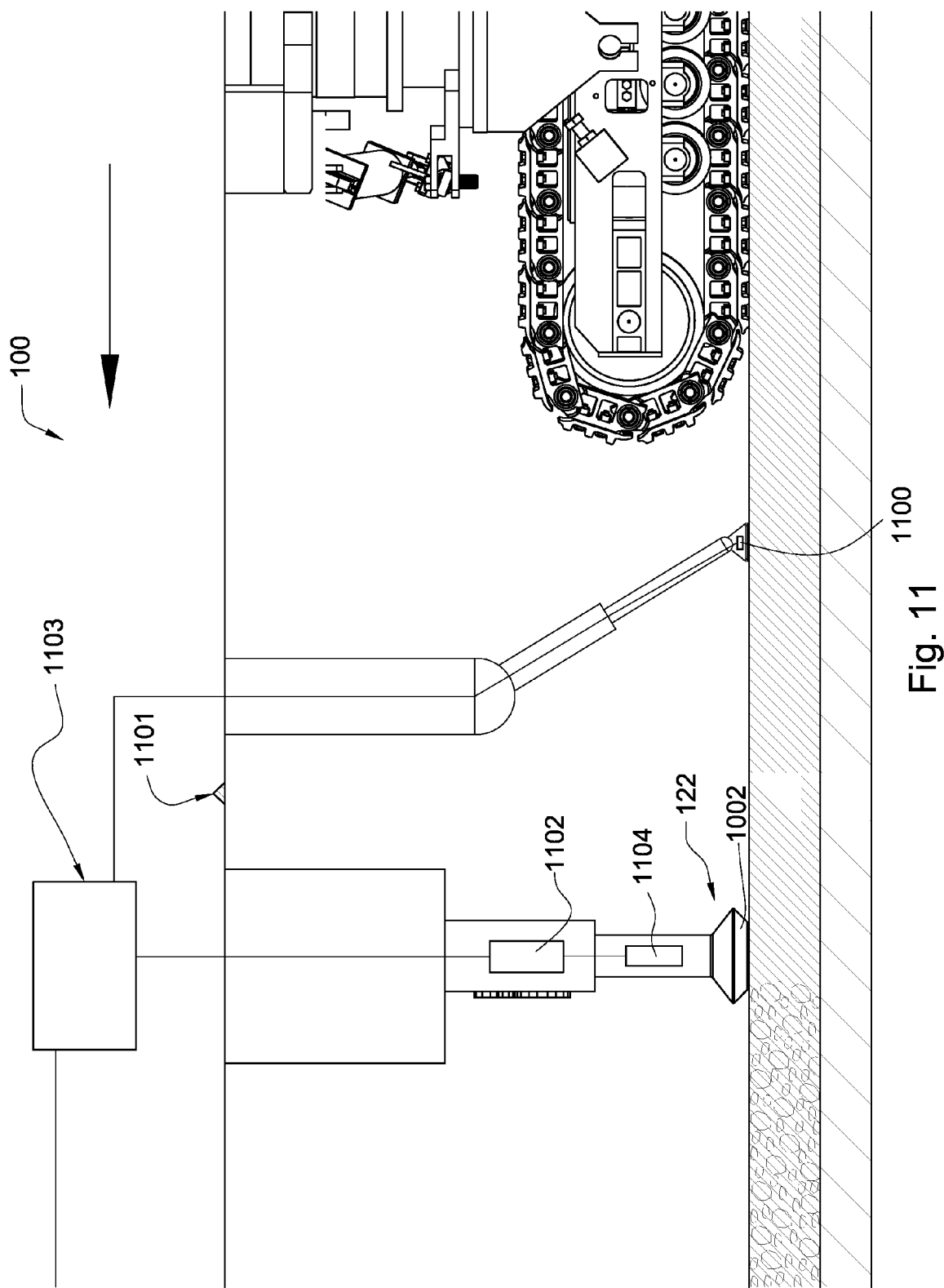
FIG. 11 is a perspective diagram of an embodiment of a motorized pavement resurfacing vehicle.

FIG. 11 is a cross sectional diagram of a portion of the motorized pavement resurfacing vehicle 100. The motorized vehicle 100 may comprise a closed loop system to control the compacting of the mix. The closed loop system may include density sensors 1100, position sensors 1101, actuators 1102, compacting elements 122 and a controller 1103. A sensor 1101 may report the position of one or more compacting elements 122 to the controller 1103. The controller 1103 may then determine the proper placement of the compacting elements 122 and place them there through an actuator 1102. Once in place the controller 1103 may then actuate the compacting element 122. The amounts of force with witch the compacting surfaces 1002 strike the mix may also be controlled by the controller 1103. A density 1100 and/or pressure sensor 1104 may then take a measurement from which the controller 1103 determines if the section of mix needs more compaction. The controller may adjust the compactor's parameters if it is determined that the mix is too compacted or not compacted enough. The compacting elements 122 may then continue to compact the mix until the mix is packed to the desired density. In some embodiments, the position sensor may be a vertical displacement sensor. A pressure sensor in combination with the position sensor may be used to determine the density of the compacted mix. It may be desired for some roads or other paved surfaces to have a contour or multiple inclinations. In such situations, the compactors may be adjusted by the controller which receives input from at least one type of sensor. In alternate embodiments the closed loop system may further include the degradation elements as well as the foaming elements.

Figure 12:
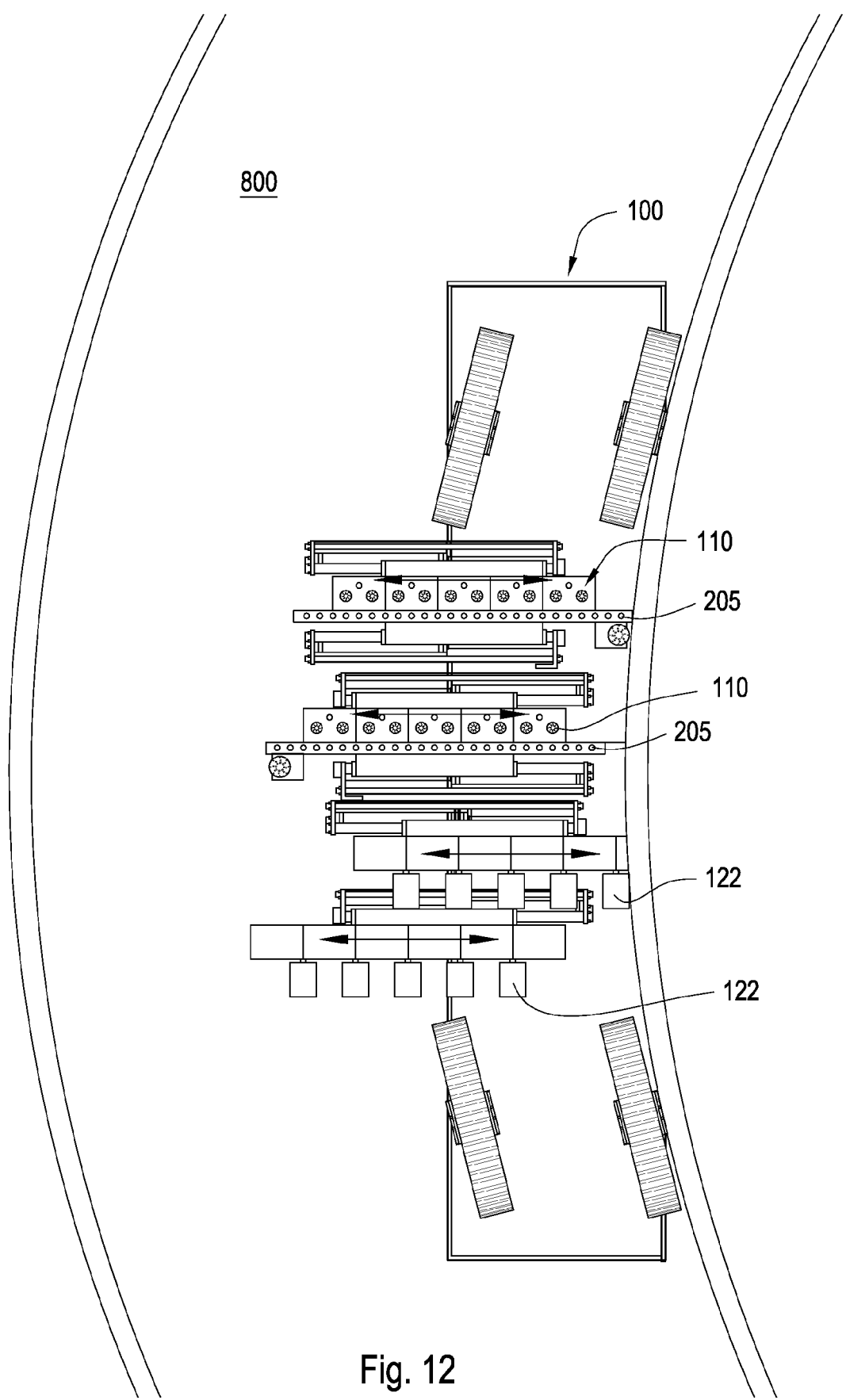
FIG. 12 is a bottom view of an embodiment of the motorized pavement resurfacing vehicle.
Figure 13:
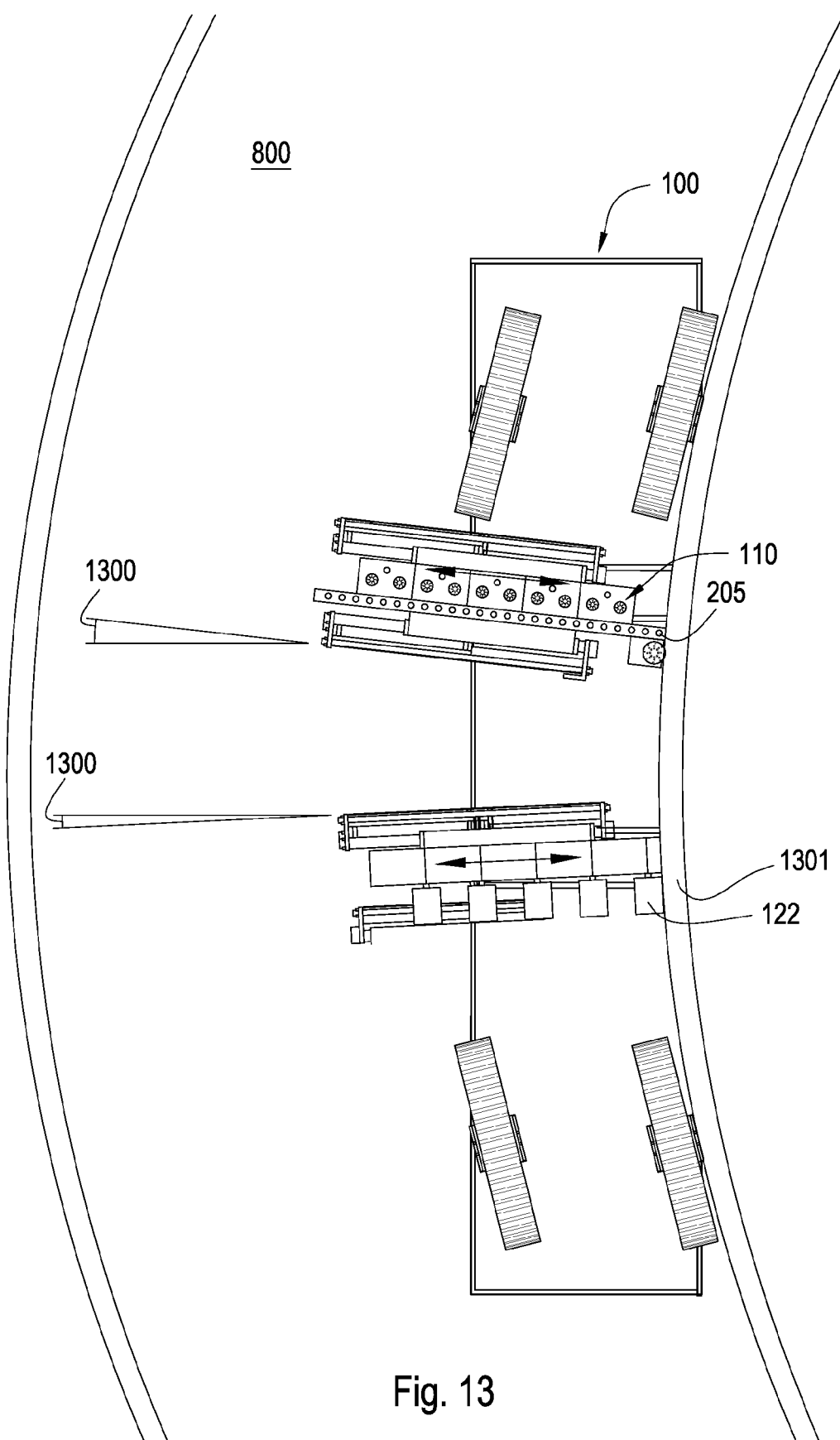
FIG. 13 is a bottom view of an embodiment of the motorized pavement resurfacing vehicle.

FIGS. 12 and 13 are bottom views of the motorized vehicle 100 on a curved road 800. In such a condition the row of degradation elements 110 may slide either to the left or right to compensate for the curve in the roadway 800 as shown in FIG. 12. FIG. 13 shows an alternate embodiment of how the vehicle may be able to pivot the slidable carriage 108 to cut closer to the sidewalk 1301 or other surfaces adjacent to the roadway 800. The angle 1300 at which the carriage 108 is pivoted may be set to correspond with the curvature of the road 800. A combination of pivoting and sliding to the side may also be used to give the most flexibility. All other components of the vehicle may also be slidable and pivotable including the compacting elements 122 and the foaming elements 205.

Figure 14:
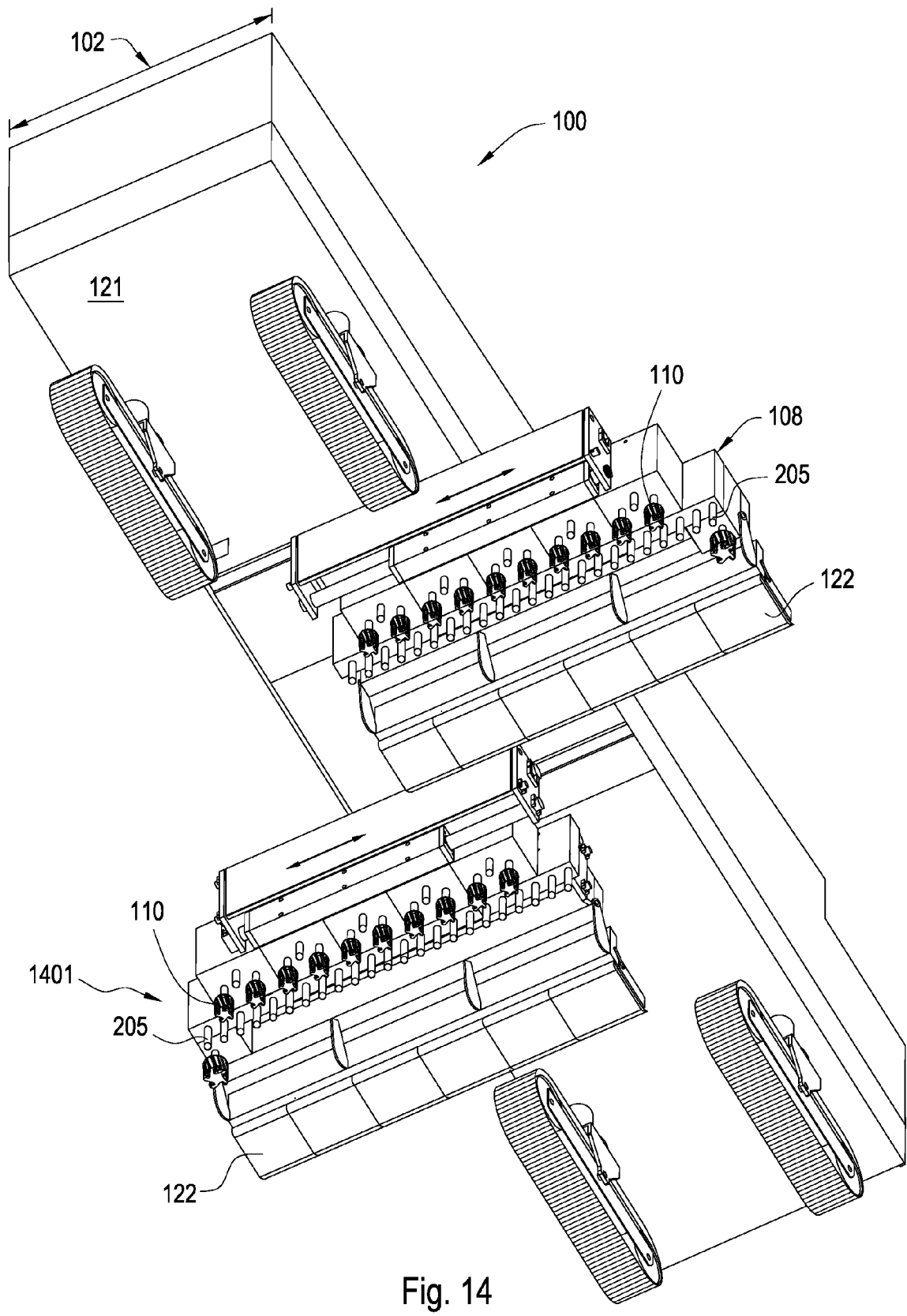
FIG. 14 is a bottom view of an embodiment of the motorized pavement resurfacing vehicle.

FIG. 14 is a perspective diagram showing an embodiment of the underside 121 of the motorized vehicle 100. In the current embodiment each of the elements of the vehicle 100 including the degradation elements 110, the foaming elements 205 and the compacting elements 122 may be secured on there own slidable carriage 108 or be secured to a shared slidable carriage 108. It may also be beneficial to have a second row 1401 of elements 110, 122, 205. This may allow the motorized vehicle 100 to recycle a section of road wider than the vehicles 100 width 102. This may allow a section to be compacted that was missed in the first row of compactors.

Whereas the present invention has been described in particular relation to the drawings attached hereto, it should be understood that other and further modifications apart from those shown or suggested herein, may be made within the scope and spirit of the present invention.

What is claimed is:

1. A method for recycling a paved surface, comprising:
providing a motorized vehicle adapted to traverse a paved surface;
providing the motorized vehicle with a plurality of degradation elements, a plurality of foaming elements and a plurality of compacting elements;
at least two of the degradation elements being adapted for independent movement relative to each other;

each plurality being attached to a carriage slidably supported by a bearing surface of an underside of the motorized vehicle;

degrading the paved surface with the plurality of degradation elements as the vehicle traverses the paved surface;

foaming rejuvenation material by the plurality of foaming elements into the degraded surface as the surface is being degraded; and compacting the degraded surface and the rejuvenation material into a new surface with the plurality of compaction elements as the foaming elements continue to foam rejuvenation material into the degraded surface.

2. The method of claim 1, wherein the compacting elements are tampers, rollers, and/or vibrators.

3. The method of claim 1, wherein the compacting elements comprise a coating selected from the group consisting of Fluoropolymers, Teflon®, diamond, carbon coatings and combinations thereof.

4. The method of claim 1, wherein the compacting elements comprise a heating element on the compacting surface.

5. The method of claim 1, wherein at least one compacting element oscillates.

6. The method of claim 1, wherein the frequency of oscillation of the compacting elements is controllable by a controller.

7. The method of claim 1, wherein the compacting elements are movable with respect to the rest of the vehicle longitudinally along the axis of the vehicle or transversely normal to the axis, or combinations thereof.

8. The method of claim 1, wherein the compacting elements comprise a density sensor.

9. The method of claim 1, wherein the pressure applied by the compacting elements is controllable by a controller.

10. The method of claim 1, wherein the compacting elements are independently controllable by a controller.

11. The method of claim 1, wherein the compacting elements function as part of a closed loop system.

12. The closed loop system of claim 11, further comprising a density sensor, a position sensor, an actuator and a controller.

13. The method of claim 1, wherein the motorized vehicle comprises multiple rows of compactors.

14. The method of claim 1, wherein the motorized vehicle comprises a trimming compactor.

15. The method of claim 1, wherein the slidable carriage comprises a hydraulic actuator, a pinion gear, a smart material actuator, an electric actuator or combinations thereof.

16. The method of claim 1, wherein the carriage is pivotable.

17. The method of claim 1, wherein the foaming rejuvenation material comprises bitumen, tar, oil, water, resins, binding agents, waxes, synthetic clay, and combinations thereof.

18. The method of claim 1, wherein the foaming rejuvenation material is heated to a temperature of at least 100° F.

19. The method of claim 1, wherein the front translational elements are on old pavement and the back translational elements are on resurfaced pavement.

20. The method of claim 1, wherein the degrading, foaming and compacting takes place between the front translational elements and the back translational elements.

* * * * *